US006806416B1

(12) United States Patent
Pike

(10) Patent No.: US 6,806,416 B1
(45) Date of Patent: Oct. 19, 2004

(54) MAINTENANCE OF FLUIDIC DIELECTRICS IN RF DEVICES

(75) Inventor: Randy T. Pike, Grant, FL (US)

(73) Assignee: Harris Corporation, Melbourne, FL (US)

( * ) Notice: Subject to any disclaimer, the term of this patent is extended or adjusted under 35 U.S.C. 154(b) by 23 days.

(21) Appl. No.: 10/409,261

(22) Filed: Apr. 8, 2003

(51) Int. Cl.[7] ................................................ H02G 15/20

(52) U.S. Cl. ...................... 174/11 R; 310/348; 333/246

(58) Field of Search ........................ 174/11 R; 310/348; 333/246

(56) References Cited

U.S. PATENT DOCUMENTS

| | | | | |
|---|---|---|---|---|
| 4,011,474 A | * | 3/1977 | O'Neill | 310/328 |
| 4,783,987 A | * | 11/1988 | Hager et al. | 73/32 A |
| 4,851,681 A | | 7/1989 | DePauli | |
| 5,140,498 A | | 8/1992 | Radford et al. | |
| 6,065,195 A | | 5/2000 | Chatterjee et al. | |
| 6,447,106 B1 | | 9/2002 | Watanabe et al. | |
| 6,501,625 B1 | | 12/2002 | Boismier et al. | |

OTHER PUBLICATIONS

U.S. patent application Ser. No. 10/441,743, Pike, filed May 19, 2003.
U.S. patent application Ser. No. 10/628,846, Pike et al., filed Jul. 28, 2003.
U.S. patent application Ser. No. 10/369,436, Rawnick et al., filed Feb. 18, 2003.
U.S. patent application Ser. No. 10/387,208, Rawnick et al., filed May 11, 2003.
U.S. patent application Ser. No. 10/330,755, Rawnick et al., filed Dec. 27, 2002.
U.S. patent application Ser. No. 10/330,754, Rawnick et al., filed Dec. 27, 2002.
U.S. patent application Ser. No. 10/300,456, Rawnick et al., filed Nov. 19, 2002.
U.S. patent application Ser. No. 10/361,548, Rawnick et al., filed Feb. 10, 2003.
U.S. patent application Ser. No. 10/387,209, Rawnick et al., filed Mar. 11, 2003.
U.S. patent application Ser. No. 10/439,094, Rawnick et al., filed May 15, 2003.
U.S. patent application Ser. No. 10/387,194, Brown et al., filed Mar. 11, 2003.
U.S. patent application Ser. No. 10/439,435, Brown et al., filed May 15, 2003.
U.S. patent application Ser. No. 10/414,696, Brown et al., filed Apr. 16, 2003.
U.S. patent application Ser. No. 10/637,027, Brown et al., filed Aug. 7, 2003.
U.S. patent application Ser. No. 10/414,650, Brown et al., filed Apr. 16, 2003.
U.S. patent application Ser. No. 10/635,629, Brown et al., filed Aug. 6, 2003.
U.S. patent application Ser. No. 10/459,067, Brown et al., filed Jun. 11, 2003.
U.S. patent application Ser. No. 10/438,436, Rawnick et al., filed May 15, 2003.
U.S. patent application Ser. No. 10/626,090, Brown et al., filed Jul. 24, 2003.

(List continued on next page.)

*Primary Examiner*—Hung V. Ngo
(74) *Attorney, Agent, or Firm*—Sacco & Associates PA

(57) ABSTRACT

Method for preventing degradation of a fluid dielectric (106) in an RF device (100). The method can include the steps forming a substrate (102) of the RF device (100) from a low temperature co-fired ceramic (LTCC), positioning within a cavity structure (104) of the substrate (102) at least one fluid dielectric (106), and agitating the fluid dielectric (106) with a piezoelectric device (112). According to one aspect of the invention, the piezoelectric device (112) can be formed from lead zirconate titanate.

22 Claims, 2 Drawing Sheets

OTHER PUBLICATIONS

U.S. patent application Ser. No. 10/635,582, Rawnick et al., filed Aug. 6, 2003.
U.S. patent application Ser. No. 10/632,632, Rawnick et al., filed Aug. 1, 2003.
U.S. patent application Ser. No. 10/614,149, Brown et al., filed Jul. 7, 2003.
U.S. patent application Ser. No. 10/634,219, Rawnick et al., filed Aug. 5, 2003.
U.S. patent application Ser. No. 10/458,859, Rawnick et al., filed Jun. 11, 2003.
U.S. patent application Ser. No. 10/624,378, Brown et al., filed Aug. 22, 2003.
U.S. patent application Ser. No. 10/438,433, Rawnick et al., May 15, 2003.
U.S. patent application Ser. No. 10/460,947, Rawnick et al., Jun. 13, 2003.
U.S. patent application Ser. No. 10/421,352, Rawnick et al., Apr. 23, 2003.
U.S. patent application Ser. No. 10/441,743, Pike, filed May 19, 2003.
U.S. patent application Ser. No. 10/628,846, Pike et al., filed Jul. 28, 3003.
U.S. patent application Ser. No. 10/448,973, Delgado et al., filed May 30, 2003.
U.S. patent application Ser. No. 10/300,455, Brown et al., Nov. 19, 2002.

* cited by examiner

MAINTENANCE OF FLUIDIC DIELECTRICS IN RF DEVICES

BACKGROUND OF THE INVENTION

1. Statement of the Technical Field

The inventive arrangements relate generally to RF devices and more particularly to preventing degradation of fluid dielectric that are used in RF devices.

2. Description of the Related Art

Glass ceramic substrates calcined at 850~1,000 C are commonly referred to as low-temperature co-fired ceramics (LTCC). This class of materials have a number of advantages that make them especially useful as substrates for RF systems. For example, low temperature 951 co-fire Green Tape™ from Dupont® is Au and Ag compatible, and it has a thermal coefficient of expansion (TCE) and relative strength that are suitable for many applications. The material is available in thicknesses ranging from 114 μm to 254 μm and is designed for use as an insulating layer in hybrid circuits, multi-chip modules, single chip packages, and ceramic printed wire boards, including RF circuit boards. Similar products are available from other manufacturers.

LTCC substrate systems commonly combine many thin layers of ceramic and conductors. The individual layers are typically formed from a ceramic/glass frit that can be held together with a binder and formed into a sheet. The sheet is usually delivered in a roll in an unfired or "green" state. Hence, the common reference to such material as "green tape". Conductors can be screened onto the layers of tape to form RF circuit elements antenna elements and transmission lines. Two or more layers of the same type of tape is then fired in an oven. The firing process shrinks all of the dimensions of the raw part. Accordingly, it is highly important that the material layers all shrink in a precise, predetermined way that will provide consistent results from one module to the next.

Recent interest in fluid dielectric materials suggest the use of LTCC as a substrate because of its known resistance to chemical attack from a wide range of fluids. The material also has superior properties of wetability and absorption as compared to other types of solid dielectric material. These factors, plus LTCC's proven suitability for manufacturing miniaturized RF circuits, make it a natural choice for use in RF devices incorporating fluid dielectrics.

Still, the use of fluid dielectrics raises new potential problems. For example, fluid dielectrics can suffer degradation from a variety of factors. For example, the degradation can occur due to temperature variations, micro-gravity, phase separation, particulate settling and orientation, ionic migration, dendritic growth, and other intrinsic molecular separation phenomena. Some of these problems are less likely to occur in dynamic systems. However, even in the case of dynamic systems, fluids can separate due to particle fallout, particle separation, sedimentation, eddy effects and so on. These kinds of fluid degradations will effect the overall electrical characteristics of the fluid dielectric, regardless of whether the fluid is a dielectric suspension, dielectric agglomerate, a dielectrically loaded fluid, or a polymer blend.

SUMMARY OF THE INVENTION

The invention concerns a method for preventing degradation of a fluid dielectric in an RF device. The method can include the steps forming a substrate of the RF device from a low temperature co-fired ceramic (LTCC), positioning within a cavity structure of the substrate at least one fluid dielectric, and agitating the fluid dielectric with a piezoelectric device. According to one aspect of the invention, the piezoelectric device can be formed from lead zirconate titanate (PZT) component. According to another aspect of the invention, the piezoelectric device can be in direct contact with the fluid dielectric. Also, at least one electrical contact can be provided in the substrate and coupled to the PZT for applying an exciter voltage.

The method can also include the step of bonding the PZT to the substrate. The bonding step can be performed by positioning the PZT in contact with the substrate and co-firing the substrate together with the PZT. The PZT can be elementally doped to enhance embedded interstitial bonding with the substrate. For example, the PZT can be doped with calcium, lead, zirconium, oxygen, titanium, or a rare earth element selected from the group consisting of Ruthenium, Osmium, Rhenium, Halfnium, Tantalum, and Germanium. The doping level can be advantageously selected to be in the range from between about 0.5 to 18 percent weight of the PZT The invention can also include an RF device that includes a substrate formed of a low temperature co-fired ceramic (LTCC). A cavity structure can be formed within the substrate and at least one fluid dielectric can be contained within the cavity structure. Further, a piezoelectric device can be provided for agitating the fluid dielectric. The piezoelectric device can be in direct contact with the fluid dielectric. The RF device can also include at least one electrical contact formed in the substrate and coupled to the PZT for applying an exciter voltage.

According to one aspect, the piezoelectric device can be comprised of lead zirconate titanate (PZT) that is bonded to the substrate. The PZT and the substrate can be advantageously co-fired together. The PZT can also be doped to enhance embedded interstitial bonding with the substrate. For example, the PZT can be doped with calcium, lead, zirconium, oxygen, titanium, or a rare earth element selected from the group consisting of Ruthenium, Osmium, Rhenium, Halfnium, Tantalum, and Germanium. In any case, the dopant material can comprise between about 0.5 to 18 percent weight of the PZT.

DETAILED DESCRIPTION OF THE PREFERRED EMBODIMENTS

Figure 1:
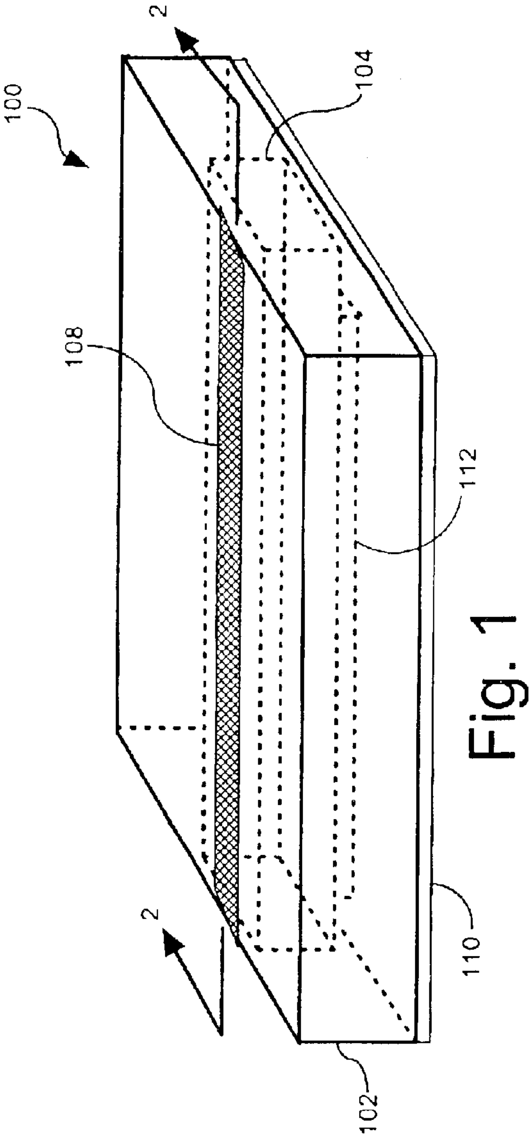
FIG. 1 is a perspective view of an RF device that is useful for understanding the present invention.

An RF device 100 that incorporates a fluid dielectric is illustrated in FIG. 1. The RF device 100 can include any type of RF circuit or component that advantageously makes use of at least one type of fluid dielectric to enhance performance or aid in controlling an operating parameter of the device. In FIG. 1, the RF circuitry is illustrated as including an RF transmission line component 108. However, the invention is not so limited. For example, the RF componentry can include, without limitation, antenna elements, matching sections, delay lines, beam steering elements, tunable transmission lines, stubs and filters, variable attenuators, cavity structures, and any other type of RF component that can benefit from the use of fluid dielectrics.

The RF device 100 also includes one or more cavity structures 104 formed in a substrate 102. The cavity structure 104 can be provided for constraining or transporting a fluid dielectric 106 within a defined region of the substrate 102 for advantageously utilizing the fluid dielectric 106 in the RF device. For example, the cavity structure 104 can define a fluid reservoir for storing fluid dielectric 106 when it is not in use. Alternatively, the cavity structure 104 can be a portion of a conduit used for transporting the fluid dielectric 106 from one portion of the substrate to another. Further, the cavity structure can be provided for constraining the fluid dielectric 106 in a predetermined region that is directly coupled to an RF element. For example, in FIG. 1, the cavity structure 104 is positioned generally adjacent to the transmission line 108 so that the electrical properties of the fluid dielectric can directly influence the operational characteristics of the transmission line element.

In some instances it can also be desirable to include a conductive ground plane 110 on at least one side of the substrate 102. For example, the ground plane 110 can be used in those instances where the RF circuitry includes microstrip circuit elements such as transmission line 108. The conductive ground plane 110 can also be used for shielding components from exposure to RF and for a wide variety of other purposes. The conductive metal ground plane can be formed of a conductive metal that is compatible with the substrate 102.

The substrate 102 can be formed of a ceramic material. Any of a wide variety of ceramics can be used for this purpose. However, according to a preferred embodiment, the substrate can be formed of a glass ceramic material fired at 850° C. to 1,000° C. Such materials are commonly referred to as low-temperature co-fired ceramics (LTCC).

Commercially available LTCC materials are commonly offered in thin sheets or tapes that can be stacked in multiple layers to create completed substrates. For example, low temperature 951 co-fire Green Tape™ from Dupont® may be used for this purpose. The 951 co-fire Green Tape™ is Au and Ag compatible, has acceptable mechanical properties with regard to thermal coefficient of expansion (TCE), and relative strength. It is available in thicknesses ranging from 114 $\mu$m to 254 $\mu$m. Other similar types of systems include a material known as CT2000 from W. C. Heraeus GmbH, and A6S type LTCC from Ferro Electronic Materials of Vista, Calif. Any of these materials, as well as a variety of other LTCC materials with varying electrical properties can be used.

Figure 2:
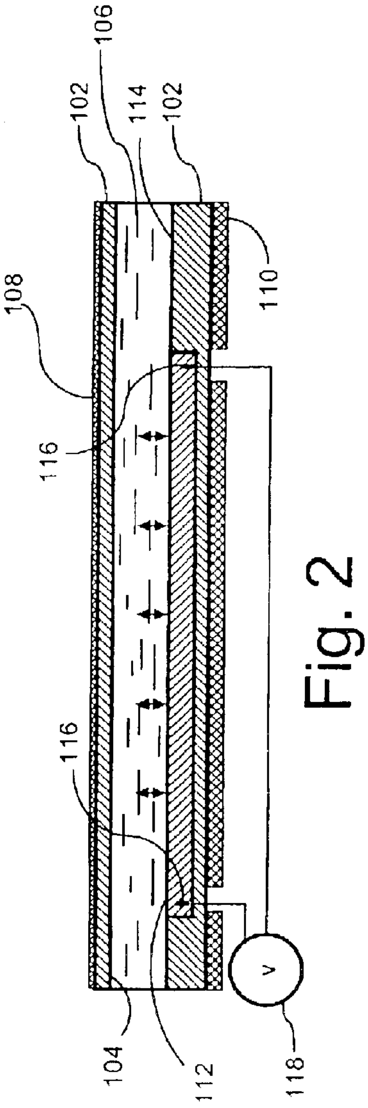
FIG. 2 is a cross-sectional view of the RF device in FIG. 1, taken along line 2—2.

According to a preferred embodiment, at least one agitation mechanism is provided for agitating the fluid dielectric 106. As illustrated in FIGS. 1 and 2, the agitation mechanism in the present invention is preferably a piezoelectric device 112. Use of piezoelectric agitation for fluid dielectrics in RF devices provides several distinct advantage as compared to other micro-agitation techniques.

One important advantage of piezoelectric agitation is the high degree of reliability of such devices due to the general absence of moving parts. Further, fluid dielectrics present special mixing problems that are not common to many other types of fluid mixing. Agitation systems that use manifolds, impellers, actuators, and certain other active systems can degrade fluid dielectric systems by inducing first, second, or higher order shear forces on the fluid. These shear forces can break inter- and intra-molecular bonds within the fluid dielectric 106, thereby causing a detrimental effect on the electrical performance of the fluid, Piezoelectric agitation is more subtle, considerably reducing the potential for damage to the fluid dielectric. Finally, RF circuit devices for certain civilian, military and space-based, applications must be capable of operating in extreme environmental conditions. Piezoelectric systems can operate effectively over a wide range of temperatures and in microgravity conditions that may occur in these environments. For all these reasons, piezoelectric agitation is particularly well suited for maintaining fluid dielectric in RF devices as described herein.

Referring to FIGS. 1 and 2, the piezoelectric device 112 is preferably positioned so that it forms a portion of the lining 114 of the cavity structure 104 in direct contact with the fluid dielectric 106. However, the invention is not limited in this regard and it is also possible to provide the piezoelectric device 112 disposed behind a membrane (not shown) so that it is not directly exposed to the fluid dielectric 106. The membrane could be formed of a thin layer of LTCC or some other material.

Electrical contacts 116 are preferably formed in the substrate 102 and coupled to the piezoelectric device 112 for applying an exciter voltage from a source 118. When the exciter voltage is applied to the piezoelectric device 112, the piezoelectric device will be induced to mechanically deform in the conventional manner of piezoelectric materials.

Despite the advantages offered by making use of piezoelectric agitation techniques, the integration of piezoelectric materials in a LTCC stack of an RF device presents certain problems. More particularly, a piezoelectric device for use in such application should be formed of a material that can be chemically bonded to the LTCC substrate and should have physical properties that are compatible with the LTCC cofiring process.

LTCC is typically a composition of calcium, potassium, titanium, magnesium and oxygen. The precise formulation depends upon the commercial source. By comparison, most piezoelectric materials are not compatible with LTCC because they are polymeric based compositions that will thermally degrade during the co-firing process.

Many crystalline materials exhibit piezoelectric behavior. However, they do not generally exhibit the effect strongly enough to be used in the present invention. Materials that do exhibit the piezoelectric effect strongly include quartz, Rochelle salt, barium titanate, and polyvinylidene flouride (a polymer film). However, these materials are not chemically compatible with the LTCC in a way that will facilitate interstitial bonding. They also have physical properties that are not compatible with LTCC firing processes. Accordingly, these materials are unsuitable for use in LTCC based applications. According to a preferred embodiment, the piezoelectric device 112 can be comprised of a known class of piezoelectric materials comprised of lead zirconate titanate ($Pb(Zr_{0.5}Ti_{0.5})O_3$, or PZT). These include, without limitation, PZT-2, PZT4, PZT-4D, PZT-5A, PZT-5H, PZT-5J, PZT-7A, PZT-8. In general, PZT requires a driving voltage of 3 VDC, to produce a deformation amplitude of 126 nmo-p at a resonance frequency peak of 304.35 kHz. It has a maximum Q value of 705. The chemical composition of PZT can also be expressed as $PbZr_{0.52}Ti_{0.48}O_3$.

In general, PZT has physical properties that are remarkably well suited for integration in a substrate 102 formed of LTCC. This factor is very important from an integration standpoint. For example, the coefficient of thermal expansion (CTE) for PZT ranges from −3.5 to $1\times10^{-6}$/K depending on the element ratio. This range is compatible with LTCC from a processing standpoint. In this regard, those skilled in the art will readily appreciate that it is important to closely match the CTE of the piezoelectric material to that of the LTCC in order to prevent micro-cracking, stress/strain, and warpage in the LTCC stack-up.

Ordinary PZT will not generally be chemically compatible with the LTCC so as to form the desired ionic or covalent molecular bonds in the co-firing process. Therefore, in order to make the PZT more compatible with LTCC, it is preferable to performing a doping step that includes doping the PZT with one or more elements contained in the PZT. Since calcium is the most common element in PZT it is preferred to dope with calcium PbZr $PbZr_{0.52}Ti_{0.48}O_3\times Ca^{2+}$ (Calcium Doped).

However, other elements contained in the LTCC could also be used as dopants including for example, lead, zirconium, oxygen, and titanium. Also, certain rare earth materials could be used for this purpose, as they are capable of having high oxidation states that can induce additional molecular bonds. Examples of rare earth element that might be selected could include Ruthenium, Osmium, Rhenium, Halfnium, Tantalum, or Germanium. In any case, the dopant material can comprise between about 0.5 to 18 percent weight of the PZT. Excessive doping levels are preferably avoided as they can potentially lead to problems relating to interstitial cracking and the harmonic response of the PZT. A properly doped PZT form can be positioned on a prefired LTCC substrate and the compositions can be co-fired together to form a single unit.

As shown by the arrows in FIG. 2, the actuation force (vector) generated by the PZT during agitation should be generated and localized on the PZT form. This force is then projected into the fluid dielectric with the force/harmonic force vector projected at an angle of about 90° relative to the lining 114 of the cavity structure 104. A DC bias voltage for the PZT can be applied at electrodes 116 as shown in FIG. 2. The bias voltage can drive the PZT to a resonant frequency around 304.35 kHz. The electrodes would preferably be on opposite ends of the slab as shown in FIG. 2.

Figure 3:
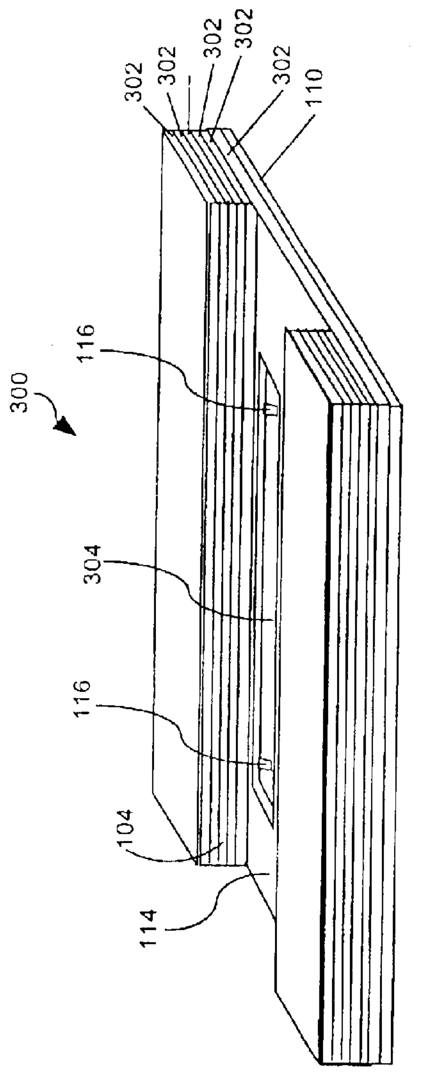
FIG. 3 is a perspective view of a ceramic material lay-up that is useful for understanding a process for fabricating the device in FIG. 1.

Referring now to FIG. 3, a process for manufacturing an RF device as described herein shall now be described in greater detail. As shown in FIG. 3, the process can begin by forming an LTCC stack 300 using conventional LTCC processing techniques. The stack 300 can be comprised of a plurality of layers of Green Tape®, or any other similar type LTCC material, so as to define a portion of the substrate 102. The stack 300 can also define at least a portion of the cavity structure 104 and can include a void 304. Once again, it should be noted that the shape, size and location of the cavity structure shown herein is merely by way of example and the invention is not intended to be limited to a cavity structure of any particular size, shape or location. Electrical contacts 116 as described above can be positioned within the void 304. Thereafter, the LTCC stack 300 can be fired in the conventional manner. LTCC initial firing temperature is typically up to about 500° C. to about 1110° C. depending on the particular design.

Figure 4:
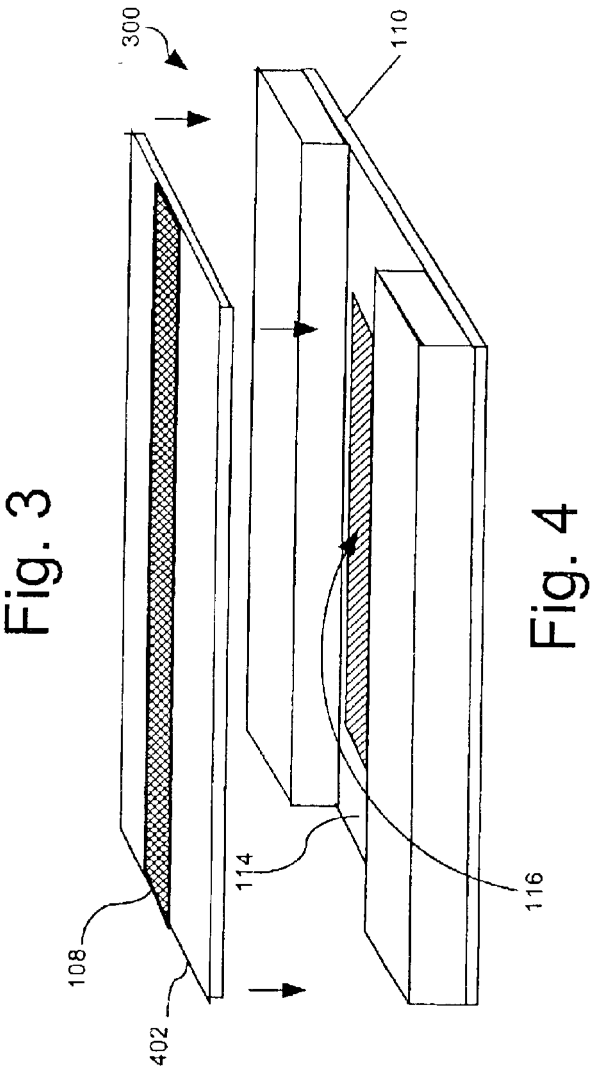
FIG. 4 is a perspective view of the ceramic material lay-up in FIG. 3 after firing, and showing the addition of the PZT and top layers.

After firing, a slurry or putty-like mixture of pre-doped PZT can be disposed in the void 304 as illustrated in FIG. 4. The part can subsequently be co-fired at a temperature of between about 500° C. to 800° C. to form the piezoelectric device 112. The remaining processing steps for completing the part, including the placement and firing of one or more ceramic layers 402, and the addition of RF circuit component(s) 108, can be performed in accordance with conventional LTCC fabrication techniques.

Finally, those skilled in the art will note that PZT ceramics must be poled to exhibit the piezo effect. During polarization the piece is heated (to allow alignment of the dipoles in the PZT and an electric field is applied. Conversely, a poled PZT will depole when heated above the maximum allowed operating temperature. PI HVPZTs have a Curie temperature of 300° C. and can be operated up to 150° C. (with P-702.10 high temperature option). LVPZTs show a Curie temperature of 150° C. and can be operated up to 80° C.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as described in the claims.

I claim:

1. A method for preventing degradation of a fluid dielectric in an RF device, comprising the steps of:

forming a substrate of said RF device from a low temperature co-fired ceramic (LTCC);

positioning within a cavity structure of said substrate at least one fluid dielectric; and agitating said fluid dielectric with a piezoelectric device.

2. The method according to claim 1 further comprising the step of selecting a material for said piezoelectric device to include lead zirconate titanate (PZT).

3. The method according to claim 2 further comprising the step of bonding said PZT to said substrate.

4. The method according to claim 3 wherein said bonding step is further comprised of positioning said PZT in contact with said substrate and co-firing said substrate together with said PZT.

5. The method according to claim 2 further comprising the step of doping said PZT to enhance bonding with said substrate.

6. The method according to claim 5 further comprising the step of doping said PZT with a material selected from the group consisting of calcium lead, zirconium, oxygen, and titanium.

7. The method according to claim 6 further comprising the step of doping said PZT with a rare earth element.

8. The method according to claim 7 further comprising the step of selecting said rare earth element from the group consisting of Ruthenium, Osmium, Rhenium, Halfnium, Tantalum, and Germanium.

9. The method according to claim 5 further comprising the step of selecting said doping level to be in the range from between about 0.5 to 18 percent weight.

10. The method according to claim 2 further comprising the step of forming at least one electrical contact in said substrate coupled to said PZT for applying an exciter voltage.

11. The method according to claim 1 wherein said piezoelectric device is in direct contact with said fluid dielectric.

12. An RF device comprising:

a substrate formed of a low temperature co-fired ceramic (LTCC);

a cavity structure formed within said substrate;

at least one fluid dielectric contained within said cavity structure; and a piezoelectric device for agitating said fluid dielectric.

13. The RF device according to claim 12 wherein said piezoelectric device is comprised of lead zirconate titanate (PZT).

14. The RF device according to claim 13 wherein said PZT is bonded to said substrate.

15. The RF device according to claim 14 wherein said PZT and said substrate are co-fired.

16. The RF device according to claim 13 wherein said PZT is doped to enhance embedded interstitial bonding with said substrate.

17. The RF device according to claim 16 wherein said PZT is doped with a material selected from the group consisting of lead, zirconium, oxygen, titanium and calcium.

18. The RF device according to claim 17 wherein said PZT is doped with a rare earth element.

19. The RF device according to claim 18 wherein said rare earth element is selected from the group consisting of Ruthenium, Osmium, Rhenium, Halfnium, Tantalum, and Germanium.

20. The RF device according to claim 16 wherein a dopant material comprises between about 0.5 to 18 percent weight of said PZT.

21. The RF device according to claim 13 further comprising at least one electrical contact formed in said substrate and coupled to said PZT for applying an exciter voltage.

22. The RF device according to claim 12 wherein said piezoelectric device is in direct contact with said fluid dielectric.

* * * * *

UNITED STATES PATENT AND TRADEMARK OFFICE

CERTIFICATE OF CORRECTION

PATENT NO. : 6,806,416 B1 Page 1 of 1
DATED : October 19, 2004
INVENTOR(S) : Pike It is certified that error appears in the above-identified patent and that said Letters Patent is hereby corrected as shown below:

Title page,
Item [56], References Cited, OTHER PUBLICATIONS,
"U.S. patent application Ser. No. 10/387,208" reference, delete "May 11, 2003" and insert -- March 11, 2003 --.
"U.S. patent application Ser. No." reference, delete "10/439,435" and insert -- 10/438,435 --.
"U.S. patent application Ser. No. 10/624,378" reference, delete "August 22, 2003" and insert -- July 22, 2003 --.

Column 4,
Line 5, delete "," after "fluid" and insert -- . --.
Line 59, delete "PZT4" and insert -- PZT-4 --.

Column 5,
Line 2, delete "1x10-6" and insert -- 11x10-6 --.

Signed and Sealed this

Twenty-seventh Day of December, 2005

JON W. DUDAS
*Director of the United States Patent and Trademark Office*